United States Patent
Delchambre et al.

(10) Patent No.: US 10,202,827 B2
(45) Date of Patent: Feb. 12, 2019

(54) DEVICE FOR STIMULATION OF WELLS AND DIAGNOSTIC METHOD FOR SUCH A STIMULATION DEVICE

(71) Applicant: ENE29 S.AR.L., Luxembourg (LU)

(72) Inventors: Michael Delchambre, Toulouse (FR); Salvador Moncho, Malakoff (FR); Xavier Horsot, Fonsorbes (FR)

(73) Assignee: ENE29 S.AR.L, Luxembourg (LU)

( * ) Notice: Subject to any disclaimer, the term of this patent is extended or adjusted under 35 U.S.C. 154(b) by 276 days.

(21) Appl. No.: 15/106,413

(22) PCT Filed: Dec. 19, 2014

(86) PCT No.: PCT/EP2014/078652
§ 371 (c)(1),
(2) Date: Jun. 20, 2016

(87) PCT Pub. No.: WO2015/091909
PCT Pub. Date: Jun. 25, 2015

(65) Prior Publication Data
US 2017/0002632 A1 Jan. 5, 2017

(30) Foreign Application Priority Data
Dec. 20, 2013 (FR) ..................................... 13 63230

(51) Int. Cl.
*H02J 7/00* (2006.01)
*H02J 7/34* (2006.01)
(Continued)

(52) U.S. Cl.
CPC ............ *E21B 43/003* (2013.01); *E21B 28/00* (2013.01); *E21B 43/26* (2013.01); *H02J 7/0024* (2013.01); *H02J 7/345* (2013.01)

(58) Field of Classification Search
CPC ......... E21B 28/00; E21B 43/003; E21B 43/26
See application file for complete search history.

(56) References Cited

U.S. PATENT DOCUMENTS

| 4,084,638 A | 4/1978 | Whiting |
| 4,343,356 A | 8/1982 | Riggs et al. |
| (Continued) | | |

FOREIGN PATENT DOCUMENTS

| EP | 2 426 311 A1 | 3/2012 |
| WO | 09/13830 A | 11/1990 |

OTHER PUBLICATIONS

International Search Report, dated Feb. 4, 2015, from corresponding PCT application.

*Primary Examiner* — Jennifer H Gay
(74) *Attorney, Agent, or Firm* — Young & Thompson

(57) ABSTRACT

A device (20) for stimulation of wells, includes a tool (200) including a capacitive element (205) and a stimulation head (210). The device further includes switching elements capable of placing the tool (200) in at least two states: i) a charging state in which the capacitive element and the stimulation head are electrically in series between the first terminal and the second terminal of the tool, in such a way that the electrical source charges the capacitive element through the stimulation head (210), and ii) a discharging state in which the capacitive element discharges through the stimulation head (210). Also, a diagnostic method for such a device (20) for stimulation of wells.

7 Claims, 2 Drawing Sheets

(51) Int. Cl.
*E21B 28/00* (2006.01)
*E21B 43/00* (2006.01)
*E21B 43/26* (2006.01)

(56) References Cited

U.S. PATENT DOCUMENTS

| | | | | |
|---|---|---|---|---|
| 4,345,650 | A | * | 8/1982 | Wesley .................. E21B 36/04 166/177.2 |
| 4,479,680 | A | * | 10/1984 | Wesley .................. E21B 43/26 166/249 |
| 5,004,050 | A | * | 4/1991 | Sizonenko ............ E21B 43/003 166/248 |
| 2011/0139441 | A1 | * | 6/2011 | Zolezzi Garreton ........................ E21B 43/003 166/249 |
| 2012/0043075 | A1 | * | 2/2012 | Abramova ............ E21B 43/003 166/249 |
| 2014/0060844 | A1 | * | 3/2014 | Barbour ................. E21B 37/00 166/311 |
| 2015/0308249 | A1 | * | 10/2015 | Delchambre ......... E21B 43/003 166/65.1 |
| 2016/0076340 | A1 | * | 3/2016 | Abramova .............. E21B 37/00 166/53 |
| 2017/0002617 | A1 | * | 1/2017 | Delchambre .......... E21B 28/00 |
| 2017/0002632 | A1 | * | 1/2017 | Delchambre ........... E21B 28/00 |
| 2017/0045633 | A1 | * | 2/2017 | Moncho .................. E21B 28/00 |
| 2017/0175505 | A1 | * | 6/2017 | Curlett ................ E21B 43/2401 |
| 2017/0204707 | A1 | * | 7/2017 | Clark ................... E21B 43/003 |

* cited by examiner

DEVICE FOR STIMULATION OF WELLS AND DIAGNOSTIC METHOD FOR SUCH A STIMULATION DEVICE

TECHNICAL FIELD

The present invention relates to an electrical well stimulation device and a diagnostic method for such a stimulation device.

The term "well stimulation" refers to generating an acoustic shock wave in a natural well or wellbore. Well stimulation is notably undertaken to improve the production of an underground resource extraction well (oil, natural gas, water, etc.), to conduct a seismic survey by measuring the acoustic wave (e.g. by means of a surface acoustic sensor), to fracture underground rock, etc.

STATE OF THE ART

In the field of well stimulation, it is known practice to use a device comprising an elongated tool adapted to be inserted into a well obtained by drilling. Such stimulation devices are known, for example, from:

U.S. Pat. No. 4,345,650, which describes a stimulation device used to improve the production of an underground resource extraction well, international patent application WO9013830, which describes a stimulation device used to conduct a seismological study, U.S. Pat. No. 4,479,680, which describes a stimulation device used to fracture underground rock.

Figure 1:
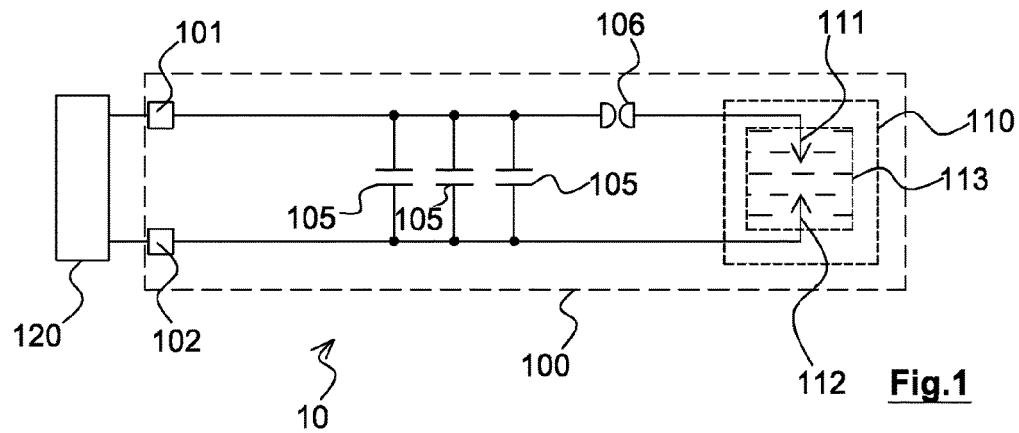

FIG. 1 shows an electric circuit diagram of an exemplary stimulation device 10 comprising a tool 100 according to the prior art.

As illustrated in FIG. 1, the tool 100 comprises a stimulation head 110 in the shape of a closed cavity 113 inside of which a first electrode 111 and a second electrode 112 are located. The first electrode 111 and the second electrode 112 are separated by water contained inside said cavity 113.

The first electrode 111 and the second electrode 112 are connected to a first terminal 101 and a second terminal 102, respectively, of the tool 100, on the outside of the cavity 113 of the stimulation head 110. The tool 100 also comprises a set of capacitive elements 105 which are electrically connected in parallel with each other and with the stimulation head 110.

The tool 100 illustrated in FIG. 1 also comprises a spark-gap 106 arranged between the capacitive elements 105 and the stimulation head 110. The spark-gap 106 primarily comprises two states:

an open state wherein the capacitive elements 105 are disconnected from the stimulation head 110, so that no electric current can flow between said capacitive elements 105 and said stimulation head 110, a closed state wherein the capacitive elements 105 are connected to the stimulation head 110, so that an electric current can flow between said capacitive elements 105 and said stimulation head 110.

Thus, by connecting a power source 120 to the first terminal 101 and to the second terminal 102 of the tool 100, the capacitive elements 105 are charged when the spark-gap 106 is in the open state, until a predetermined voltage is obtained at the terminals of all of said capacitive elements 105. The spark-gap 106 then passes to the closed state, and the voltage at the terminals of the capacitive elements is applied to the stimulation head 110. The capacitive elements 105 discharge, through the stimulation head, by circulating a pulse of high-intensity current (possibly exceeding one hundred kilo-amperes) in the fluid separating the first electrode 111 from the second electrode 112. This pulse of high-intensity current creates an acoustic shock wave that propagates in the well, for example via a flexible wall of the cavity 113. Such an acoustic shock wave can notably be used to improve the production of an underground resource extraction well, to conduct a seismic survey, and to fracture underground rock, etc.

During well stimulation operations, the tool 100 is inserted into said well with the stimulation head 110 downwards, and is lowered to the point where the stimulation is to be performed. Once the stimulation point is reached, the well can be stimulated by successive charges/discharges of the capacitive elements 105. However, a drawback of current stimulation devices lies in the fact that the state of the stimulation head cannot be checked when the tool is downhole.

PRESENTATION OF THE INVENTION

The present invention aims to offer an alternative architecture for a well stimulation device tool.

In addition, the present invention also aims to propose an architecture which can determine the state of the stimulation head when the tool is downhole.

For this reason, and according to a first aspect, the present invention relates to a well stimulation device comprising a power source connected to a first terminal and a second terminal of a tool, said tool comprising a capacitive element and a stimulation head comprising a cavity inside of which are arranged a first electrode and a second electrode separated by a fluid. The device further comprises switching means adapted to place the tool in at least two states:

a charging state wherein a first terminal of the capacitive element is connected to the first terminal of the tool and disconnected from the second electrode, and wherein a second terminal of the capacitive element is connected to the first electrode, so that, the capacitive element and the stimulation head being electrically in series between the first terminal and the second terminal of the tool, the power source charges the capacitive element through the stimulation head, a discharging state wherein the first terminal of the capacitive element is connected to the second electrode, and wherein the second terminal of the capacitive element is connected to the first electrode, so that the capacitive element discharges through the stimulation head.

Thus, the stimulation device according to the invention notably differs from known devices in that the capacitive element is charged in series with the stimulation head. It is thus possible to diagnose the state of the stimulation head with the stimulation device according to the invention.

In the event the stimulation head is damaged, for example in the event the flexible wall of the cavity becomes ripped, the external elements mix with the fluid and change the electrical properties. As the capacitive element is charged in series with the stimulation head, an electric current flows in said stimulation head while the capacitive element is being charged, so that it is possible to detect a change in the electrical properties of the fluid inside the cavity.

In specific embodiments, the well stimulation device may comprise one or more of the following characteristics, considered individually or in all technically possible combinations.

In specific embodiments, the stimulation device comprises diagnostic means adapted to determine a state of the stimulation head according to a parameter representative of the resistance of the stimulation head.

In specific embodiments, the power source is a current source, preferably a source adapted to supply a current of constant intensity while charging the capacitive element(s).

In specific embodiments, the stimulation device comprises a resistive element electrically in parallel with the stimulation head and, in the charging state, in series with the capacitive element.

Such arrangements make it possible, in case the stimulation head is damaged, such as a rip in the flexible wall of the cavity, to ensure a minimum discharge current intensity of the capacitive element, where appropriate through the resistive element. In case of damage, the resistance of the stimulation head can significantly increase, but the equivalent resistance always remains less than the resistance of the resistive element. Therefore, the capacitive element can always discharge at least through the resistive element, so that the risk of bringing a tool back to the surface whose capacitive element is not fully discharged is greatly reduced. The safety of the operators handling the tool is thus improved.

In specific embodiments, the resistance of the resistive element is at least two times greater than the theoretical resistance of the fluid separating the first electrode from the second electrode.

In specific embodiments, the power source being a current source of intensity $I_C$ and the transition from the charging state to the discharging state being performed when the voltage between the first terminal of the capacitive element and the second electrode of the stimulation head reaches a predefined upper limit value $V_O$, the resistive element is of resistance $R_S$ such that the voltage $R_S \cdot I_C$ is less than $V_O$.

In specific embodiments, the switching means comprise a spark-gap arranged between the first terminal of the capacitive element and the second electrode.

According to a second aspect, the present invention relates to a method for diagnosing an electrical well stimulation device according to any of the embodiments of the invention, comprising the following steps:
  determination of a parameter representative of the resistance of the stimulation head when the tool is in the charging state wherein, the capacitive element and the stimulation head being electrically connected in series, the power source charges the capacitive element through said stimulation head,
  determination of a state of the stimulation head according to said parameter.

In specific embodiments, the determination of the parameter corresponds to a measurement of the power supplied to the tool by the power source and/or a measurement of the time required to obtain a voltage of predefined value between the first terminal of the capacitive element and the second electrode of the stimulation head.

PRESENTATION OF FIGURES

The invention will become more apparent in light of the following description given by way of non-limiting example and with reference to the figures which represent:
  FIG. 1: already described, an electric circuit diagram of an exemplary embodiment of a well stimulation device according to the prior art,
  FIG. 2: a half-sectional view of a stimulation device in position in a well,
  FIGS. 3 and 4: electric circuit diagrams of alternative embodiments of stimulation devices according to the invention,
  FIG. 5: timing diagrams representing an example for implementing a method for diagnosing a stimulation head of a stimulation device according to the invention.

In these figures, the same references from one figure to another denote identical or similar elements. For reasons of clarity, the elements depicted are not to scale unless otherwise specified.

DETAILED DESCRIPTION OF EMBODIMENTS

Figure 2:
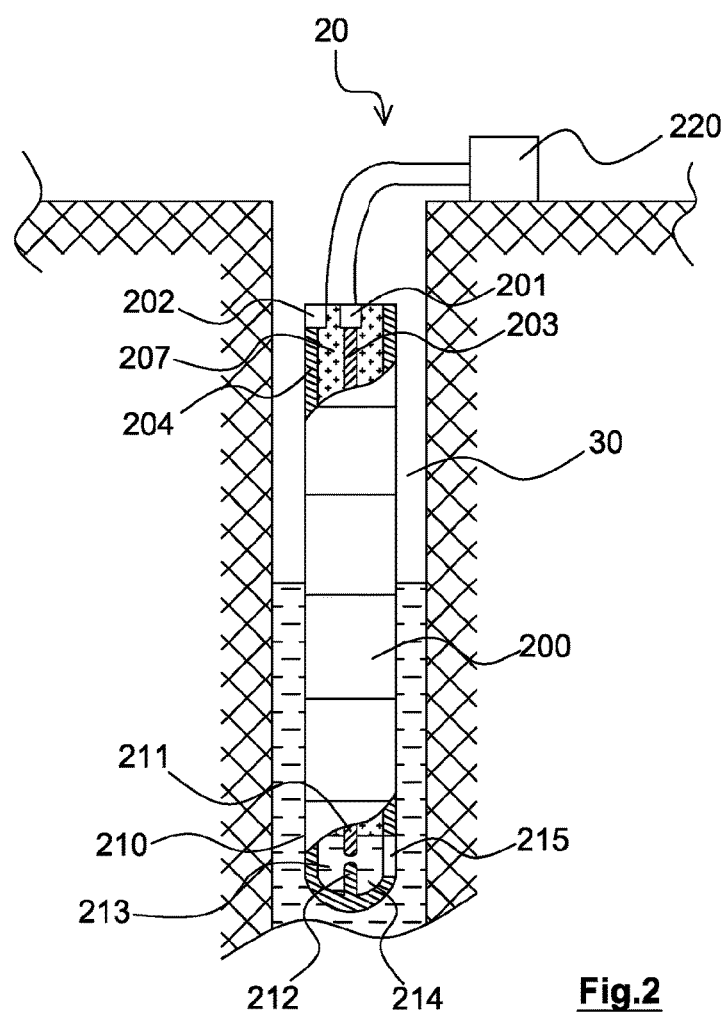

FIG. 2 schematically represents an example for implementing a well stimulation device 20 according to the invention.

The description that follows relates in a non-limiting manner to a stimulation device 20 implemented to improve the production of an underground resource extraction well. However, and as noted above, the term "well stimulation" is generally understood to mean the generation of an acoustic shock wave in a natural well or wellbore. Such well stimulation can be implemented to improve the production of an underground resource extraction well, but also to conduct a seismic study, and to fracture underground rock, etc.

As illustrated in FIG. 2, the stimulation device 20 comprises an elongated tool 200, adapted to be inserted into an extraction well 30 obtained by drilling. In specific embodiments, the tool 200 may be formed by a plurality of sections assembled end to end in a reversible manner.

More particularly, FIG. 2 represents a half-sectional view of the tool 200, wherein both ends of said tool 200 are shown in cross-section. The tool 200 also comprises, at a first end, a stimulation head 210, introduced downward into the extraction well 30, and a second end opposite said stimulation head 210.

The stimulation head 210 comprises a closed cavity 213 inside of which are located a first electrode 211 and a second electrode 212. The first electrode 211 and the second electrode 212 are separated by a fluid 214 contained inside the cavity 213. The cavity 213 is notably closed by a flexible wall 215 separating the fluid 214, located inside said cavity 213, and the underground resource, located outside said cavity. The fluid 214 is electrically conductive and can be considered as being a resistive element. Said fluid is a liquid such as water for example, with resistance in the order of 1000 ohms. According to other examples, there is nothing to exclude having a stimulation head 210 with an open cavity, in which case the fluid is the fluid contained downhole.

The description that follows relates to the case where the cavity 213 is closed. The theoretical value of the resistance of the fluid 214, i.e. the resistance of said fluid in the absence of stimulation head 210 damage, is designated hereinafter as $R_F$.

The tool 200 also comprises, at the second end for example, a first terminal 201 and a second terminal 202. The first terminal 201 is connected to the first electrode 211 via a first circuit 203, and the second terminal 202 is connected to the second electrode 212 via a second circuit 204. In the non-limiting example illustrated in FIG. 3, the first circuit 203, e.g. a brass rod, corresponds to a central core of the tool 200, while the second circuit 204, e.g. made of steel, corresponds to a peripheral wall of the tool 200. The first circuit 203 and the second circuit 204 are preferably separated by a layer 207 of electrically insulating material surrounding the first circuit 203, except for areas in which said first circuit 203 and said second circuit 204 are connected by electrical components discussed below.

The stimulation device 20 comprises a power source 220 connected to the first terminal 201 and to the second terminal 202 of the tool 200. The description that follows relates to the case where the power source 220 is a current source of constant intensity $I_C$. This example is not restrictive and, according to other examples, the power source may be a current source of intensity that varies over time, a voltage source, etc.

In the non-limiting example illustrated in FIG. 2, the power source 220 is external to the tool 200 and is connected to the first terminal 201 and to the second terminal 202 via an electric cable. According to other embodiments, there is nothing that excludes having a power source 220 built into the tool 200, for example. According to other embodiments, the power source 220 can also be only partially external to the tool 200, being distributed in two parts connected by an electric cable: a first part external to the tool 200 and a second part built into the tool 200 and connected to the first terminal 201 and to the second terminal 202 of said tool 200. For example, the first part of the power source 220 is a constant voltage source, while the second part is a converter adapted to supply a current of constant intensity $I_C$ to the tool 200 from the constant voltage received from the first part of the power source 220.

Figure 3:
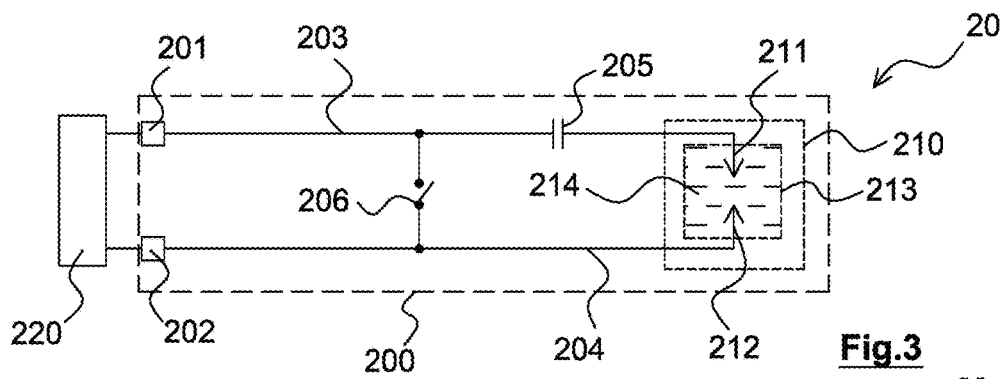

FIG. 3 represents an electric circuit diagram of the main electrical components of a specific embodiment of the tool 200. For reasons of clarity, the arrangement of said electrical components, for example the arrangement of the first circuit 203 as a central core of the tool 200 and the arrangement of the second circuit 204 as a peripheral wall of said tool 200, is not taken into account in FIG. 3.

As illustrated in FIG. 3, the first circuit 203 of the tool 200 comprises a capacitive element 205. The stimulation device 20 further comprises switching means adapted to place the tool 200 in at least two states:
    a charging state in which a first terminal of the capacitive element 205 is connected to the first terminal 201 of the tool 200 and disconnected from the second electrode 212, and wherein a second terminal of the capacitive element is connected to the first electrode 211,
    a discharging state wherein the first terminal of the capacitive element 205 is connected to the second electrode 212, and wherein the second terminal of the capacitive element 205 is connected to the first electrode 211.

In the non-limiting example illustrated in FIG. 3, the first terminal of the capacitive element 205 is connected directly to the first terminal 201 of the tool 200, and the second terminal of said capacitive element 205 is connected directly to the first electrode 211 of the stimulation head 210. "Connected to" means that an electric current can flow between the elements under consideration. "Connected directly to" means that the elements under consideration are connected without an intermediate electrical component.

In addition, the switching means comprise a switch 206 connected firstly to a point on the first circuit 203 located between the first terminal 201 of the tool 200 and the capacitive element 205 and, secondly, to a point on the second circuit 204 located between the second terminal 202 of the tool 200 and the second electrode 212 of the stimulation head 210. The switch 206 conventionally comprises an open state, wherein no electric current flows between the terminals of said switch 206, and a closed state, wherein an electric current can flow between said terminals of said switch 206.

When the power source 220 is connected to the first terminal 201 and to the second terminal 202 of the tool 200, it is therefore understood that:
    when the switch 206 is in the open state: the capacitive element 205 and the stimulation head 210 are electrically in series between the first terminal 201 and the second terminal 202 of the tool 200, so that said power source 220 charges the capacitive element 205 through the stimulation head 210,
    when the switch 206 is in the closed state: the capacitive element 205 discharges through the stimulation head 210.

The transition of the switch from the open state to the closed state is, for example, performed when a predefined discharge condition is obtained. For example, said predefined condition is obtained when the voltage across the terminals of the switch 206 or the capacitive element 205 reaches a predetermined upper limit value. In such a case, the switch 206 is advantageously a spark-gap whose breakdown voltage is chosen to be equal to said predetermined upper limit value, so that the spark-gap will automatically transition to the closed state when the voltage on its terminals reaches said upper limit value.

Other embodiments are possible, however. According to other non-limiting examples, the stimulation device 20 may comprise a control module that controls the switch 206 based on the voltage measurements at the terminals of said switch 206 or at the terminals of the capacitive element 205.

As noted above, in the charging state, the power source 220 charges the capacitive element 205 through the stimulation head 210. As the power source 220 in this example provides a current of constant intensity $I_C$, the voltage at the terminals of the capacitive element 205 increases linearly, while the voltage between the first electrode 211 and the second electrode 212 is substantially constant, equal to $R_F \cdot I_C$. For example, the discharge of the capacitive element 205 is triggered when the voltage at the terminals of the switch 206 reaches a predefined upper limit value $V_0$, which corresponds to a voltage $V_1$ at the terminals of the capacitive element 205 equal to:

$$V_1 = V_0 - R_F \cdot I_C$$

During discharge, the discharge current flowing between the first electrode 211 and the second electrode 212 is thus of intensity $I_D$ equal to $V_1/R_F$. The various electrical components of the stimulation device 20 are preferably configured so that the intensity $I_D$ is in the order of a few tens of kilo-amperes to a few hundred kilo-amperes. The flow of such a discharge current causes an acoustic shock wave within the cavity 213, which propagates into the extraction well 30 notably via the flexible wall 215.

Figure 4:
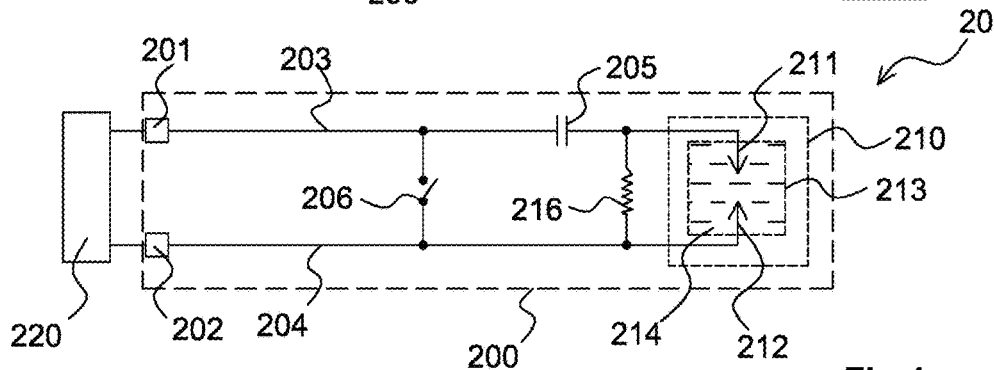

FIG. 4 represents a preferred embodiment of the tool 200 of FIG. 3, wherein the tool 200 further comprises a resistive element 216 connected in parallel with the stimulation head 210, between a point on the first circuit 203 located between the capacitive element 205 and the first electrode 211, and a point on the second circuit 204 located between the second electrode 212 and the switch 206. The resistive element 216 has a resistance $R_S$ at least two times greater than the theoretical value $R_F$ of the resistance of the fluid 214 separating the first electrode 211 from the second electrode 212.

As the resistance $R_S$ of the resistive element 216 is at least twice greater than the theoretical value $R_F$ of the resistance of the fluid 214, it is ensured that, in the absence of damage, the charge current and the discharge current of the capacitive element 205 flow mainly through the fluid 214. In preferred embodiments, the resistance $R_S$ of the resistive element 216 is at least ten times, or even a hundred times greater than said theoretical value $R_F$ of the resistance of the fluid 214. Thus, the intensity of the current flowing in the resistive element 216 is significantly lower than the intensity of the current flowing in the stimulation head 210.

The resistive element 216 makes it possible to ensure that the intensity of the discharge current of the capacitive element 205 is always greater than a predetermined lower limit value, even in the event the stimulation head is damaged. In the case, for example, of a rip in the flexible wall 215, external elements from the extraction well can enter the cavity 213 and modify the resistance of the fluid 214. Typically, the resistance of the fluid 214 can increase to a value $R_Z$ significantly higher than the theoretical value $R_F$. In such a case, the discharge of the capacitive element 205 is much slower or even impossible. Owing to the resistive element 216 connected in parallel with the stimulation head 210, the equivalent resistance of the assembly formed by said resistive element 216 and the stimulation head 210 is therefore always less than $R_S$, so that the capacitive element 205 can always be discharged.

As noted above, the capacitive element 205 of the tool 200 is charged in series with the stimulation head 210. Therefore, while charging, an electrical current flows in said stimulation head 210, between the first electrode 211 and the second electrode 212.

In this way, any change in the electrical properties of the stimulation head 210, and more specifically the resistance of the fluid 214 (transition from the theoretical value $R_F$ to the value $R_Z$), can in principle be detected by observing a parameter representative of said resistance of said fluid 214. The analysis of said parameter when the tool 200 is in the charging state thus makes it possible to determine a state of the stimulation head 210, for example to detect abnormal behavior likely to be caused by a rip in the flexible wall 215 of the cavity 213.

Preferably, the observed parameter is the power delivered to the tool 200 by the power source 220. Observing the power is advantageous, in the case of a power source 220 at least partially external to the tool 200, insofar as it may be carried out remotely from the tool 200 (on the surface), without having to add a dedicated voltage and/or current sensor in said tool 200.

Figure 5:
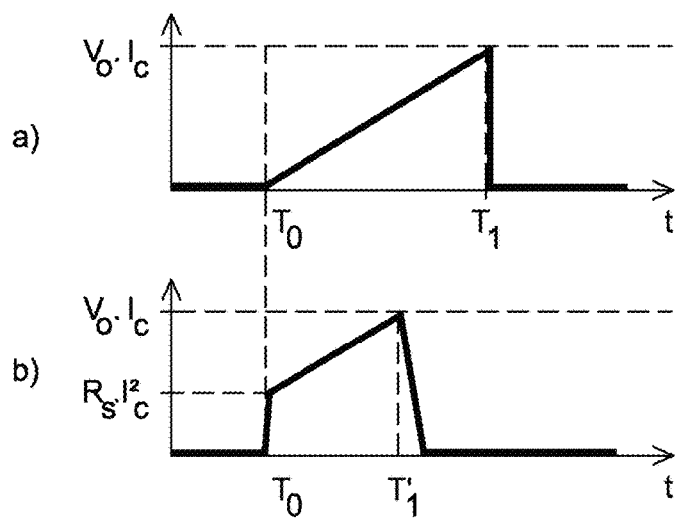

FIG. 5 schematically represents the temporal behavior of the power supplied by the power source 220 to the tool 200, in the case of the stimulation device 20 illustrated in FIG. 4, and in the case where the transition from the charging state to the discharging state is made when the voltage at the terminals of the switch 206 reaches a predefined upper limit value $V_0$ (or equivalently: the power supplied by the power source reaches an upper limit value $V_0 \cdot I_C$). The case can further be considered where the theoretical value $R_F$ of the resistance of the fluid is much less than the resistance $R_S$ of the resistive element 216, and the case can be considered where the value $R_Z$ of the resistance of the fluid in case of damage is much greater than the resistance $R_S$ of said resistive element. Therefore, in the absence of damage, the equivalent resistance of the assembly formed by the resistive element 216 and the stimulation head 210 is substantially equal to $R_F$, while it is substantially equal to $R_S$ in case of damage.

Part a) of FIG. 5 corresponds to the case where the stimulation head 210 is not damaged. The power dissipated throughout the assembly formed by the stimulation head 210 and the resistive element 216, during charging, is consequently equal to $R_F \cdot I_C^2$, and is considered negligible in relation to the power $V_0 \cdot I_C$. In part a) of FIG. 5, the charge of the capacitive element 205 starts at time $T_0$. At this moment, the power supplied to the capacitive element 205 is substantially zero, as is the power supplied to the stimulation head 210. The power provided by the power source 220 then gradually increases to reach, at time $T_1$, the power $V_0 \cdot I_C$ for which the switch 206 passes from the open state to the closed state. The capacitive element 205 then discharges almost instantaneously through the stimulation head 210.

Part b) of FIG. 5 corresponds to the case where the stimulation head 210 is damaged, so that the stimulation head 210 has a resistance $R_Z$ much greater than the resistance $R_S$ of the resistive element 216. The power dissipated in the assembly formed by the stimulation head 210 and the resistive element 216, during charging, is therefore equal to $R_S \cdot I_C^2$, and is not negligible in relation to the power $V_0 \cdot I_C$. In part b) of FIG. 5, the charge of the capacitive element 205 starts at time $T_0$. At this moment, the power supplied to the capacitive element 205 is substantially zero, and the power source 220 must supply a power $R_S \cdot I_C^2$ to the resistive element 216. The power supplied by the power source 220 then gradually increases to reach, at time $T'_1$, the power $V_0 \cdot I_C$ for which the switch 206 changes from the open state to the closed state. The capacitive element 205 then discharges through the resistive element 216, more slowly than in part a) of FIG. 5.

Therefore, observing the power supplied by the power source 220 makes it possible to determine the state of the stimulation head 210. For example, if at the start of the charge, at time $T_0$, the power supplied increases suddenly (part b), the stimulation head is likely damaged. Such a sudden increase of the power supplied can also be detected as soon as the resistance $R_S$ of the resistive element 216 is at least two times higher than the theoretical value $R_F$. In addition, it is noted that the charging time $(T'_1-T_0)$ in case of damage is less than the charging time $(T_1-T_0)$ in the absence of damage. Therefore, it is also possible to determine the state of the stimulation head 210 by comparing the actual charging time to a predetermined reference time.

It should be noted that it is also possible to determine the state of the stimulation head 210 in the case of the stimulation device 20 of FIG. 3. In the case of damage, then, the stimulation head 210 has resistance $R_Z$. Therefore, at time $T_0$, the power supplied will theoretically equal $R_Z \cdot I_C^2$ instead of $R_F \cdot I_C^2$, so that the state of the stimulation head 210 can be determined in an analogous manner according to the power supplied at time $T_0$, or depending on the charging time.

However, the power $R_Z \cdot I_C^2$ can be very high and result in damage to certain electronic components. In addition, the power $R_Z \cdot I_C^2$ can be greater than the power $V_0 \cdot I_C$ making it impossible to charge the capacitive element. The presence of the resistive element 216, particularly of resistance $R_S$ such that the power $R_S \cdot I_C^2$ is less than the power $V_0 \cdot I_C$ (or equivalently such that the voltage $R_S \cdot I_C$ is lower than the voltage $V_0$), as is the case in FIG. 5, makes it possible to avoid any damage to the electronic components and all blockage of the tool 200.

It should also be noted that it is possible to determine the state of the stimulation head 210 in the case where the cavity 213 is open, as soon as a theoretical value $R_F$ of the fluid contained downhole is known. It will thus be possible to detect all variation in the resistance of the fluid downhole in relation to said theoretical value $R_F$, associated for example with the mixture of external elements with said fluid following the generation of an acoustic shock wave.

More generally, it should be noted that the implementation methods and embodiments considered above were described as non-limiting examples, and that other variations are consequently possible.

In particular, the invention has been described with consideration of the power supplied by the power source 220 as a parameter observed to diagnose the state of the stimulation head 210. Other representative parameters of the resistance of the stimulation head 210 are possible, such as for example the voltage at the terminals of the stimulation head 210 during charging, the voltage at the terminals of the switch 206 during charging, and the duration of said charge, etc.

The description above clearly illustrates that the present invention achieves the goals it has set by its various features and advantages. In particular, a stimulation device 20 according to the invention allows the state of the stimulation head 210 to be monitored in the bottom of the extraction well 30. The state of the stimulation head 210 can be determined automatically by diagnostic means of the stimulation device 20, or by an operator observing for example the power supplied at the start of the charge, the duration of said charge, etc.

The invention claimed is:

1. A well stimulation device comprising:
a power source connected to a first terminal and a second terminal of a tool,
said tool comprising:
   a capacitive element,
   a stimulation head, said stimulation head comprising a cavity inside of which are arranged a first electrode and a second electrode separated by a fluid,
   a resistive element electrically in parallel with the stimulation head and, in the charging state, in series with the capacitive element, and
   a switch adapted to place the tool in at least two states:
      a charging state wherein a first terminal of the capacitive element is connected to the first terminal of the tool and disconnected from the second electrode, and wherein a second terminal of the capacitive element is connected to the first electrode, so that, the capacitive element and the stimulation head being electrically in series between the first terminal and the second terminal of the tool, the power source charges the capacitive element through the stimulation head, and
      a discharging state wherein the first terminal of the capacitive element is connected to the second electrode, and wherein the second terminal of the capacitive element is connected to the first electrode, so that the capacitive element discharges through the stimulation head.

2. The device as claimed in claim 1, wherein the power source is a current source.

3. The device as claimed in claim 1, wherein the resistive element has a resistance at least two times higher than a theoretical value $R_F$ of the resistance of the fluid that separates the first electrode from the second electrode, $R_F$ being the resistance of the fluid in the absence of stimulation head damage.

4. The device as claimed in claim 1, wherein the power source being a current source of intensity $I_C$ and the transition from the charging state to the discharging state being carried out when the voltage between the first terminal of the capacitive element and the second electrode of the stimulation head reaches a predefined upper limit value $V_0$, the resistive element is of resistance $R_S$ such that the voltage $R_S \cdot I_C$ is less than $V_0$.

5. The device as claimed in claim 1, wherein the switch is a spark-gap arranged between the first terminal of the capacitive element and the second electrode.

6. A diagnostic method of an electric well stimulation device as claimed in claim 1, comprising:
determining a parameter representative of the resistance of the stimulation head when the tool is in the charging state wherein, the capacitive element and the stimulation head being electrically connected in series, the power source charges the capacitive element through said stimulation head,
determining a state of the stimulation head according to said parameter.

7. The method as claimed in claim 6, wherein the determination of the parameter corresponds to a measurement of the power supplied by the power source and/or a measurement of the time required to obtain a voltage of predefined value between the first terminal of the capacitive element and the second electrode of the stimulation head.

* * * * *